United States Patent [19]

Yoshida et al.

[11] Patent Number: 5,027,769
[45] Date of Patent: Jul. 2, 1991

[54] THROTTLE VALVE CONTROL APPARATUS

[75] Inventors: Masato Yoshida; Yoshiaki Danno, both of Kyoto; Kazuhide Togai, Takatsuki, Japan

[73] Assignee: Mitsubishi Jidosha Kogyo Akbushiki Kaisha, Tokyo, Japan

[21] Appl. No.: 567,596

[22] Filed: Aug. 15, 1990

[30] Foreign Application Priority Data

Aug. 25, 1989 [JP] Japan .................................. 1-217394
Aug. 25, 1989 [JP] Japan .................................. 1-217395
Aug. 25, 1989 [JP] Japan .................................. 1-217396

[51] Int. Cl.$^5$ ...................... F02D 11/10; F02M 35/10
[52] U.S. Cl. ................................ 123/399; 123/52 M; 123/403; 123/432
[58] Field of Search ........ 123/52 M, 52 MC, 52 MV, 123/361, 399, 308, 403, 432, 442

[56] References Cited

U.S. PATENT DOCUMENTS

| | | | |
|---|---|---|---|
| 4,512,311 | 4/1985 | Sugiyama | 123/442 X |
| 4,519,360 | 5/1985 | Murakami | 123/403 X |
| 4,612,615 | 9/1986 | Murakami | 123/399 X |
| 4,726,343 | 2/1988 | Kruger | 123/432 |
| 4,766,853 | 8/1988 | Iwanami | 123/432 X |
| 4,796,584 | 1/1989 | Goto et al. | 123/403 |
| 4,803,961 | 2/1989 | Hiraoka et al. | 123/52 M X |
| 4,834,048 | 5/1989 | Adamis et al. | 123/52 M X |
| 4,841,935 | 6/1989 | Yamada et al. | 123/432 |
| 4,854,283 | 8/1989 | Kiyono et al. | 123/399 X |
| 4,898,138 | 2/1990 | Nishimura et al. | 123/399 |

Primary Examiner—Willis R. Wolfe
Attorney, Agent, or Firm—Abelman Frayne Rezac & Schwab

[57] ABSTRACT

Throttle valves are individually disposed in a plurality of intake passages of an engine. In normal operation condition of the throttle valves, a first control device controls the throttle valves according to the detection result of an operation condition detecting device to control the amounts of intake air of the individual intake passages, thereby obtaining good engine performance from low-speed to high-speed ranges. When an abnormality detecting device detects an abnormality in a throttle valve, a determination device determines a normal throttle valve, and a second control device controls only the normal throttle valve in preference to the first control device to control the intake air amount, thereby ensuring continued operation even if a malfunction occurs in one of the throttle valves. Also, intake passages of the engine are divided into two systems and are individually connected with surge tanks, a communication passage communicating with the surge tanks and a communication control valve ae provided, throttle valves and intake control valves are disposed in the individual passages, and the throttle valves, the communication control valve and the intake control valves are open/closed controlled by the operation condition detecting device and control device, thereby obtaining good engine performance and ensuring continued operation of the engine even if a malfunction occurs in the throttle valve control system, to maintain the stability of the vehicle.

25 Claims, 7 Drawing Sheets

THROTTLE VALVE CONTROL APPARATUS

FIELD OF THE INVENTION

This invention relates to a throttle valve control apparatus of a so-called drive by wire (DBW) type which drives a throttle valve to open and close an air intake passage of an engine by a motor.

BACKGROUND OF THE INVENTION

Recently, in most of gasoline engines used in passenger cars, the fuel supply amount, ignition timing and the like are electronically controlled in view of pollution control of exhaust gas and in order to assure the engine performance such as output. The carburetor and throttle valve of an electronic fuel injection device have heretofore been opened and closed according to the intention of the driver through a cable directly connected to the acceleration pedal. However, with the advance of auto-cruising devices and mechanical automatic transmissions, there has been developed a DBW type throttle valve control apparatus which electronically controls the throttle valve by an electric actuator such as a servo motor.

In general, in this type of throttle valve control apparatus, various data such as the clutch connection condition and intake air temperature, in addition to the pressing-down amount of the acceleration pedal, are processed by a microprocessor to control the throttle valve to an optimum opening according to the current running condition of the vehicle. As a result, while an auto-cruising device is in operation, for example, the throttle valve opening can be automatically controlled so that the vehicle speed is maintained at a preset value regardless of the load conditions such as running on an ascending slope, or, in a clutch-off state in a mechanical automatic transmission, the throttle valve can be easily closed independently of the operation amount of the acceleration pedal.

However, in a DBW type throttle valve control apparatus, there may a case in which the throttle valve opening becomes uncontrollable due to a malfunction of its control system including the motor.

To cope with such a case, there is a method in which the throttle valve is provided with a return spring to urge the throttle valve to the closing direction, and, when a malfunction occurs, the throttle valve is fully closed by the force of the spring. However, with this method, there may be a case in which desired output characteristics cannot be obtained when a malfunction occurs, resulting in an impaired running stability of the vehicle.

SUMMARY OF THE INVENTION

With a view to eliminate the prior art problems, it is a primary object of the present invention to provide a throttle valve control apparatus for an engine which, when a malfunction occurs, continues operation to assure the running stability of the vehicle and provides a good engine performance during normal operation.

In accordance with the present which attains the above object, there is provided a throttle valve control apparatus comprising an engine mounted on a vehicle, an intake passage unit divided into at least two air intake systems for forming intake passages to supply air to the engine, throttle valves disposed in the individual intake passages, operation condition detecting means for detecting the operation condition of the vehicle, first control means for controlling the amount of air taken into the engine by open/close controlling the throttle valves according to the operation condition of the vehicle detected by the operation condition detecting means, abnormality detecting means for detecting an abnormality in any of the throttle valves to output a detection result, a determination means for determining a normal throttle valve from the detection result of the abnormality detecting means when an abnormality is detected in any of the throttle valves by the abnormality detecting means to output a determination result, and second control means for controlling the amount of air supplied to individual cylinders of the engine by controlling only a normal throttle valve determined by the determination means when an abnormality is detected in any of the throttle valves according to the operation condition of the vehicle detected by the operation condition detecting means in preference to the first control means.

Thus, in normal operation of the vehicle, the first control means open/close controls the individual throttle valves of the individual intake passages according to the operation conditions detected by the operation condition detecting means, thereby functioning as a variable air intake system.

When a malfunction occurs in the control system of one of the throttle valves of the intake passages, the abnormality detecting means detects the malfunction, the determination means determines a normal throttle valve, the second control means open/close controls the normal throttle valve according to the operation condition detected by the operation condition detecting means, thereby maintaining a normal operation of the vehicle.

There is also provided according to the present invention a throttle valve control apparatus comprising an engine mounted on a vehicle, a first divided passage unit comprising two first divided passages, two surge tanks individually and independently connected to the downstream of the first divided passages of the first divided passage unit, a communication passage providing communication between the surge tanks, a communication control valve to open and close the communication passage, a second divided passage unit comprising second divided passages individually and independently connected to the downstream of the surge tanks, intake air control valves disposed in the individual second divided passages, confluence passages formed to join the second divided passages of the second divided passage unit and communicating with individual cylinders of the engine, throttle valves disposed in the individual first divided passages of the first divided passage unit, operation condition detecting means for detecting the operation condition of the vehicle, and control means for open/close controlling the throttle valves, the communication control valve, and the intake air control valves according to the operation condition of the vehicle detected by the operation condition detecting means.

Thus, in normal operation of the vehicle, the control means open/close controls the individual intake air control valves and the communication control valve according to the operation condition of the vehicle detected by the operation condition detecting means to obtain an inertial air-boost effect or a resonant air-boost effect in both the low-speed and high-speed ranges.

When a malfunction occurs in the control system of one of the throttle valves of the intake passages, the control means open/close controls the individual intake air control valves and the communication control valve to open/close control a normal throttle valve, thereby maintaining a normal operation condition of the vehicle.

DETAILED DESCRIPTION OF THE INVENTION

A first embodiment of the throttle valve control apparatus according to the present invention will now be described with reference to FIG. 1 to FIG. 3.

Figure 1:
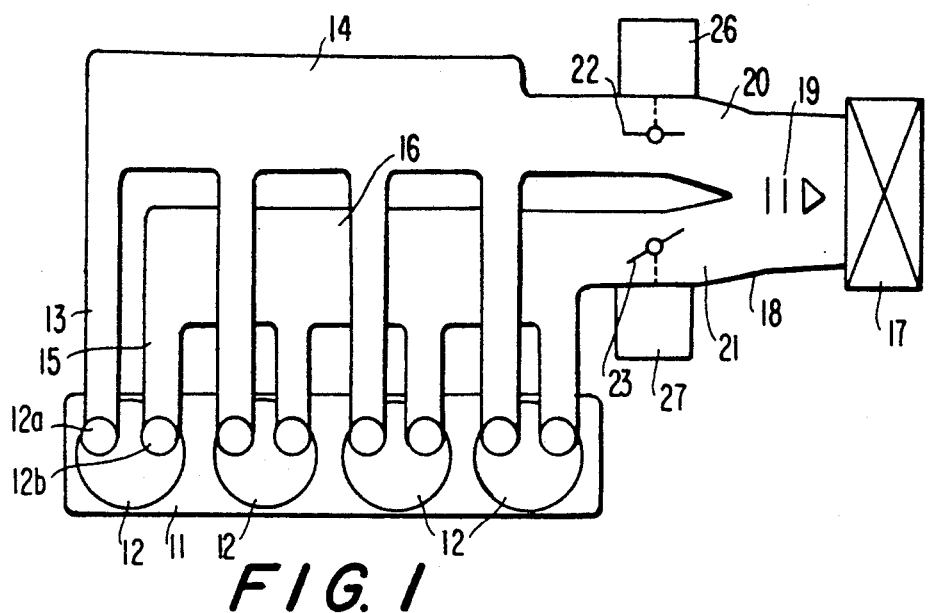
FIG. 1 is a schematic view showing the structure of an air intake system of the engine in a first embodiment of the throttle valve control apparatus according to the present invention.

As shown in FIG. 1, an engine 11 used in this embodiment is a 4-cylinder engine, provided with an air intake unit forming intake passages comprising two divided air intake systems to supply air to the engine 11.

Specifically, each cylinder 12 is provided with two intake ports 12a and 12b individually for low speed and high speed, and has intake valves (not shown). Exhaust ports are not shown.

The individual low-speed intake ports 12a are connected with relatively long low-speed passages 13 as a divided passage unit, and these communicate with a surge tank 14 as a common confluence passage unit. The individual high-speed ports 12b are connected with high-speed passages 15 as a divided passage unit which are shorter than the low-speed passages 13, and these communicate with a surge tank 16 as a common confluence passage unit.

An air intake hole is provided with an air cleaner 17, and an air flow sensor 19 is disposed in an adjacent common passage 18. The passage 18 is divided into passages 20 and 21, which individually communicate with the surge tanks 14 and 16. Individual throttle valves 22 and 23 are attached to the throttle valves 22 and 23 to control the flow rates of air.

Thus, the low-speed intake port 12a and the high-speed intake port 12b have the common air intake hole, but individually have independent intake passages comprising respectively the passage 20, the surge tank 14 and the passage 13; and the passage 21. the surge tank 16 and the passage 15, and the individual intake passages have throttle valves 22 and 23.

Then, the throttle valves 22 and 23 will be described, but since these are same in structure, description will be made with reference to a single drawing.

Figure 2:
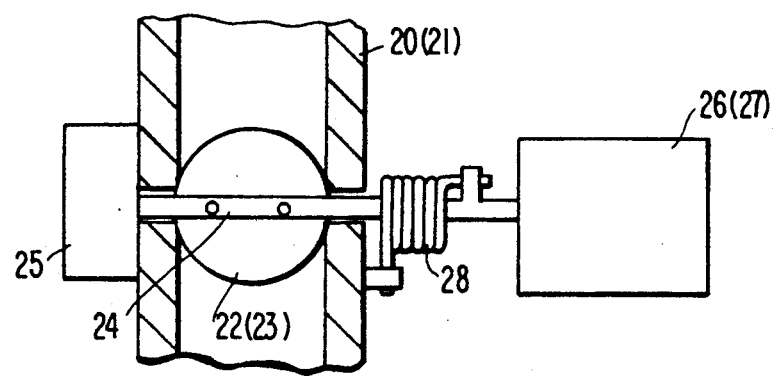
FIG. 2 is a schematic cross sectional view of a driving unit of the throttle valve control apparatus.

As shown in FIG. 2, a throttle valve 22 (23) is rotatably disposed halfway in the passage 20 (21), and its opening is varied with its rotational angle position. A throttle position sensor 25 for detecting the opening is attached to one end of a rotating shaft of the throttle valve 22 (23), and the other end is connected to a drive shaft of a servo motor 26 (27) fixed to a frame (not shown).

Furthermore, a return spring 28 as a torsion coil spring is wound around the rotating shaft 24 to urge the throttle valve 22 (23) towards the full-closed position. Thus, the throttle valve 22 (23) is opened by the driving force of the servo motor 26 (27) against the force of the return spring 28, and is fully closed when the servo motor 26 (27) does not operate.

Fuel injection valves can be located, for example, as in an SPI system, in which the valves are disposed in the common passage 18, in a 2-way SPI system, in which the valves are disposed at upstream sides of the throttle valves 22 and 23, or in a 2-way MPI system, in which the valves are disposed individually in the low-speed passage 13 and the high-speed passage 15 of each cylinder 12.

The throttle valve control system will now be described.

The throttle valve control apparatus of this embodiment comprises operation condition detecting means comprising acceleration pedal operation amount detecting means and engine operation condition detecting means, first control means for controlling intake air amount by open/close controlling the throttle vale according to the acceleration pedal operation amount and the load condition or the rotation speed of the engine when all of the throttle valves are normal, abnormality detecting means comprising throttle valve opening detecting means, opening deviation calculation means, integrating calculation means, and abnormality determination means, determination means for determining a normal throttle valve according to the detection result of the abnormality detecting means, and second control means for controlling the intake air amount by fully closing the abnormal throttle valve and controlling only the normal throttle valve in preference to the first control means.

With this arrangement, in a low-speed operation, the throttle valve 23 of the high-speed intake passage side is fully closed, and intake air control is made only by open/close controlling of the throttle valve 22 of the low-speed intake passage side. As a result, since the intake passage is small in cross section and long in length in low-speed operation, a pulsation effect of intake air in the low-speed range can be sufficiently utilized to improve the output torque.

In high-speed operation, on the other hand, intake air control is made with the throttle valve 23 of the high-speed intake passage side opened in addition to the low-speed side. As a result, in high-speed operation, the intake passage cross section is increased, the intake resistance is reduced, and the passage length is reduced, the pulsation effect of intake air can be utilized up to the high-speed rotation range.

When any of the control systems of the motors 26 and 27 to drive the throttle valve 22 and 23 malfunctions, power supply is stopped to the motor 26 or 27. By the action of the return spring 28, the malfunctioned throttle valve 22 or 23 is fully closed to close the intake system of the malfunctioned side. Thereafter the normal side motor 27 or 26 is operated to make intake control, thereby continuing operation. Therefore, operation of the vehicle can be assured to run by itself at least to a repair shop even if a malfunction occurs in one of the control systems.

Determination of whether or not a malfunction occurs in a throttle valve control system is made as follows.

The operation condition detecting means detects a measured value of throttle opening from a target throttle opening and the throttle position sensor 25, and the abnormality detecting means calculates and outputs a difference between the target throttle opening and the measured value. The determination means determines whether or not the calculated value exceeds a certain value and, if exceeds, it determines a malfunction in the control system of a throttle valve because the throttle valves 22 and 23 do not follow. And, the second control means controls only the abnormal throttle valve in preference to the first control means to control the amount of intake air.

Figure 3:
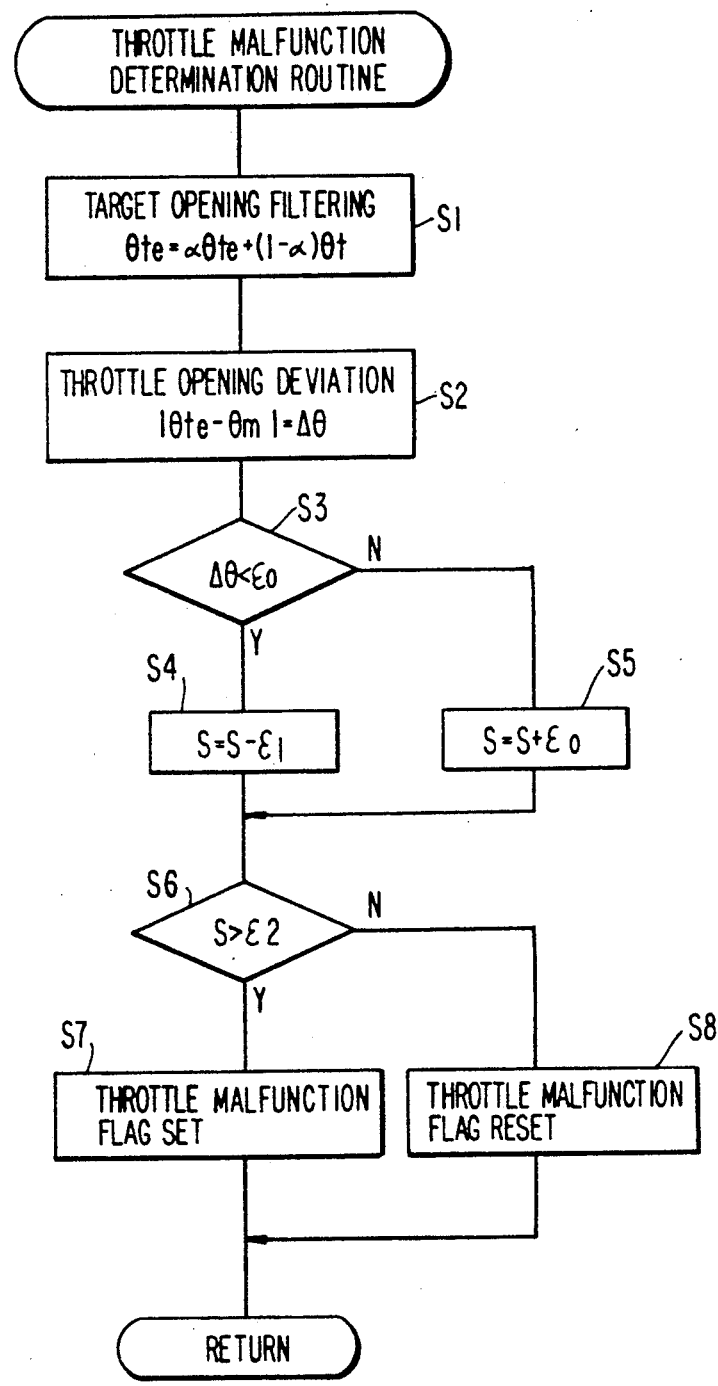
FIG. 3 is a malfunction determination flow chart.

FIG. 3 shows an example of malfunction determination flow chart.

In FIG. 3, in view of a response delay of valve, target opening $\theta_t$ is passed through a primary filter and compared with measured opening $\theta_m$. First, in step S1, target filter value $\theta_{te}$ is calculated from previously calculated $\theta_{te}$ using the equation $\theta_{te} = \alpha \theta_{te} + (1-\alpha)\theta_t$, wherein $\alpha$ is a filter constant which is selected within the range $0 \leq \alpha < 1$. In step S2, difference $\Delta\theta$ between the target filter value $\theta_{te}$ and the measured opening $\theta_m$ is determined, and, in step S3, whether or not the difference $\Delta\theta$ is smaller than allowable deviation $\epsilon_0$ is determined. When the difference $\Delta\theta$ is smaller than the allowable deviation $\epsilon_0$, integrated deviation S is set to a value subtracted by integrated deviation reduction value $\epsilon_1$ in step S4. When, in step S3, the difference $\Delta\theta$ is greater than the allowable deviation $\epsilon_0$, the integrated deviation value S is set to a value increased by $\epsilon_0$.

Then, in step S6, whether or not the integrated deviation value S is greater than integrated deviation limit $\epsilon_2$ is determined. If greater, it is determined as a malfunction, and a throttle malfunction flag is set in step S7. If smaller, the flag is reset in step S8.

This malfunction determination is made for each throttle valve.

In the embodiment shown in FIG. 1, the throttle valves 22 and 23 are disposed at the upstream side of the individual surge tanks 14 and 16. However, alternatively, these may be disposed as port valves at the downstream side of the surge tanks.

Figure 4:
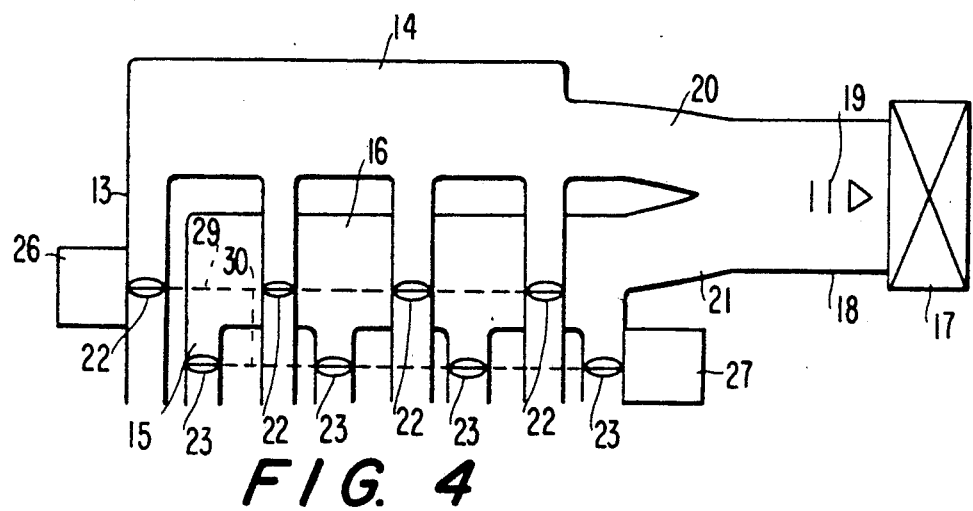
FIG. 4 is a schematic view showing an air intake system of the engine in a second embodiment of the throttle valve control apparatus according to the present invention.

FIG. 4 is a schematic view showing part of the air intake system of the engine of a second embodiment according to the present invention. In FIG. 4, the same portions or those having the same functions as those in FIG. 1 are indicated by the same reference marks. As shown in FIG. 4, in this embodiment, the individual low-speed passages 13 and the individual high-speed passages 15 are provided with the throttle valves 22 and 23.

A plurality of throttle valves 22 disposed in the individual low-speed passages 13 are linked with a common drive shaft 29 to move simultaneously and opened and closed by the servo motor 26 connected to one end of the drive shaft 29. Similarly, a plurality of throttle valves 23 disposed in the individual high-speed passages 65 are linked with a common drive shaft 30 and opened and closed by the servo motor 27 connected to one end of the drive shaft 30. The drive shafts 29 and 30 are individually provided with return springs (not shown) urging the throttle valves 22 and 23 towards the closing directions.

Also with this arrangement, as in the previous embodiment, in normal operation the throttle valves 22 and 23 are independently controlled to obtain good engine performance from the low-speed range to the high-speed range, and, continued operation is possible even if a malfunction occurs in one of the control systems of the motors 26 and 27.

A third embodiment of the throttle valve control apparatus according to the present invention will now be described with reference to FIG. 5 and FIG. 6. Parts and components having the same functions as in the above-described embodiments are indicated by the same reference marks and detailed description thereof is omitted.

Figure 5:
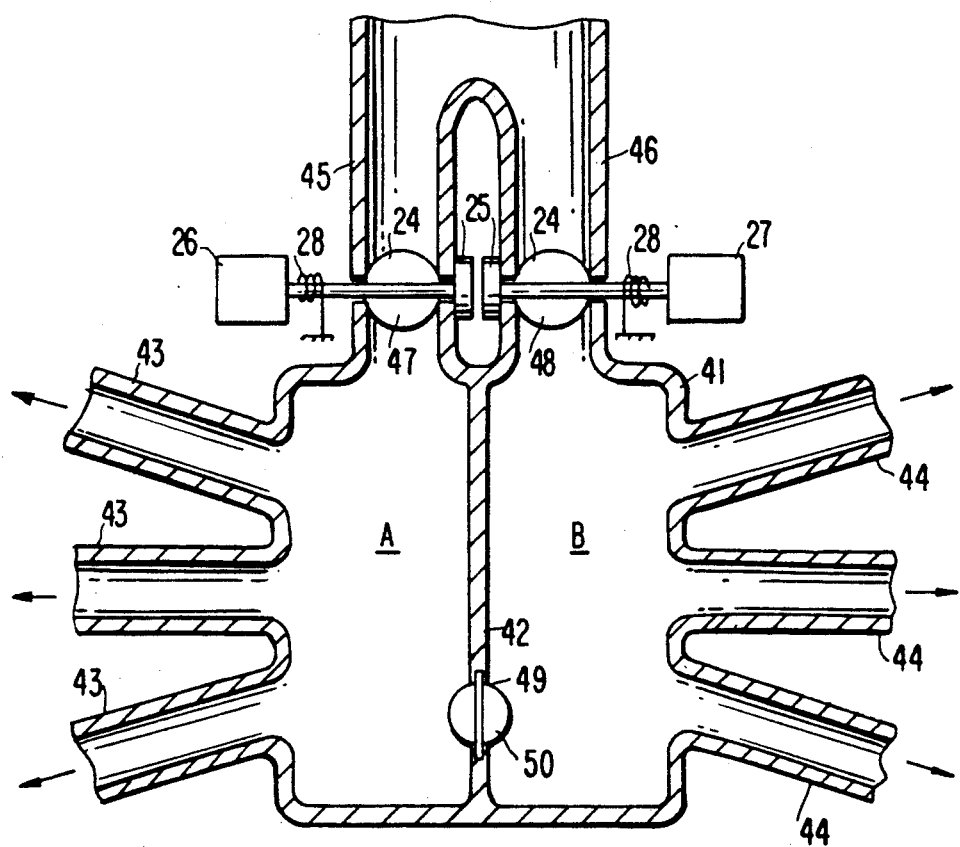
FIG. 5 is a schematic cross sectional view of a third embodiment of the throttle valve control apparatus for an engine according to the present invention.

As shown in FIG. 5, this embodiment is applied to a V-type 6-cylinder engine, in which a surge tank 41 forming an intake passage unit is divided inside by a partition wall 42 into chamber A and chamber B, and the individual chambers communicate with three each of intake pipes 43 and 44. The intake pipes 43 and 44 communicate with cylinders (not shown) of the engine, a group of three of six cylinders connecting through the intake pipes 43 to the chamber A of the surge tank 41, and a group of three of six cylinders connecting through the intake pipes 44 to the chamber B of the surge tank 41.

The surge tank 41 is connected with conduits 45 and 46 individually communicating with the chamber A and the chamber B, and intake air is introduced into the surge tank 41 through the conduits 45 and 46. These conduits 45 and 46 are individually provided with throttle valves 47 and 48, and the amounts of intake flowing through the individual conduits 45 and 46 are controlled according to the openings of these throttle valves 47 and 48.

Thus, the six cylinders are divided into two groups of three cylinders, each having an independent air intake system, and have throttle valves 47 and 48 which are independently controlled.

These throttle valves 47 and 48 are the same in structure as the above-described throttle valves, and detailed description thereof is omitted.

The partition wall 42 of the surge tank 41 is provided with a communication hole 49 as a communication portion, where a shutter valve 50 as a communication control valve is mounted. The two chambers are made communicating with each other and isolated according to the open/close operation of the shutter valve 50.

While the throttle valves 47 and 48, of which openings are required to be delicately controlled, are driven by the servo motors 26 and 27, the shutter valve 50 is sufficient to achieve fully-open and fully-closed states and can thus be driven by a simple drive unit (not shown). For example, a diaphragm type vacuum actuator utilizing a negative pressure of intake air or the like can be inexpensively used.

Then, the control systems of the throttle valves will now be described.

The throttle valve control apparatus of this embodiment comprises operation condition detecting means comprising acceleration pedal operation amount detecting means and engine operation condition detecting means, first control means having throttle valve control means for controlling throttle valves according to the acceleration pedal operation amount and intake control means for open/close controlling a communication control valve (shutter valve 50) according to the engine operation condition, abnormality detecting means for detecting an abnormality of the throttle valves, determination means for determining a normal throttle valve according to the detection result of the abnormality detecting means, and second control means for controlling the intake air amount by fully closing the abnormal throttle valve according to the detection result of the determination means and fully closing the communication valve to control only the normal throttle valve in preference to the first control means.

Figure 6A:
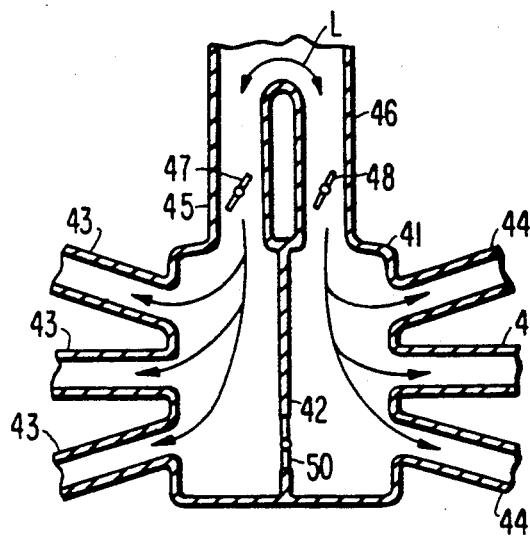
FIG. 6a–d are schematic views showing the function of the third embodiment.

With this arrangement, in low-speed operation, as shown in FIG. 6(a), the shutter valve 50 is closed to partition the surge tank 41 and intake air to the individual intake pipes 43 and 44 is controlled by the throttle valves 47 and 48. In this case, intake air pulsation passes through the portion indicated by the arrow L, and the resonant air-boost rotation range is shifted to the low-speed side, thereby improving the output torque in the low-speed range.

Figure 6B:
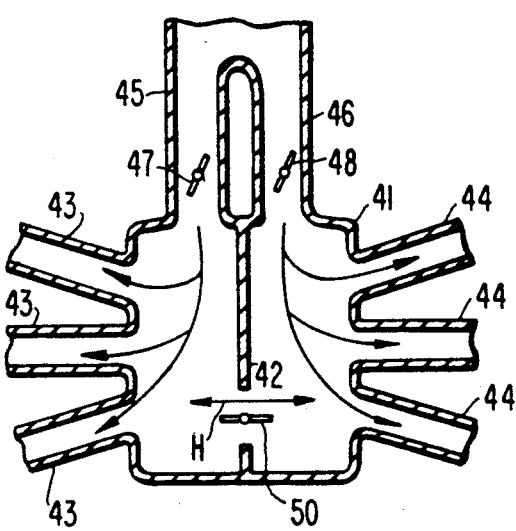

In high-speed operation, as shown in FIG. 6(b), the shutter valve 50 is opened to make communication between the two partitioned chambers of the surge tank 41. As a result, intake air pulsation passes through the portion indicated by the arrow H, and the resonant air-boost rotation range is shifted to the high-speed range, thereby improving the output torque in the high-speed range.

Now, a case when a malfunction occurs in one of the throttle valves 47 and 48 will be described.

Figure 6C:
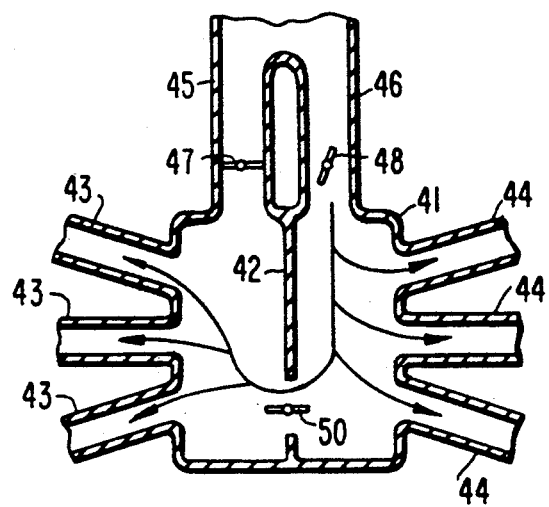

Suppose that a malfunction occurs in the control system and the throttle valve 47 or 48 is fully closed by the return spring 28. If, for example, the throttle valve 47 is fully closed and becomes uncontrollable, the shutter valve 50 is opened to make intake air control by the normal throttle valve 48, as shown in FIG. 6(c). As a result, operation of the engine can be continued without discontinuing operation of the two cylinder groups. In this case, alternatively, the shutter valve 50 may be closed to discontinue operation of the cylinder group which intakes air through the intake pipe 43.

Figure 6D:
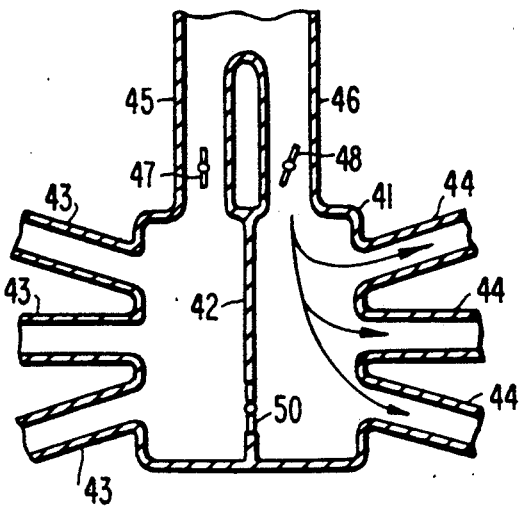

When an uncontrollable condition occurs with the throttle valve 47 or 48 opened, due to jamming of a foreign substance or the like; for example, the throttle valve 47 is fixed in the open state, as shown in FIG. 6(d), the shutter valve 50 is closed, and fuel supply is stopped to the cylinder group handled by the throttle valve 47, which intakes air through the intake pipe 43, to discontinue the operation of that cylinder group. Intake air control of the remaining cylinder group is made by the throttle valve 48 through the intake pipe 44. This prevents the occurrence of a runaway condition and ensures continued operation.

A malfunction in the throttle control system can be determined as described above. Furthermore, that the malfunction occurs with the throttle valve opened or closed can be determined from whether or not the idle switch is on, or, whether or not the throttle position sensor output exceeds a predetermined value.

A third embodiment of the throttle valve control apparatus according to the present will now be described with reference to FIG. 7 and FIG. 8. Parts and components having the same functions as in the above-described embodiments are indicated by the same reference marks and detailed description thereof is omitted.

Figure 7:
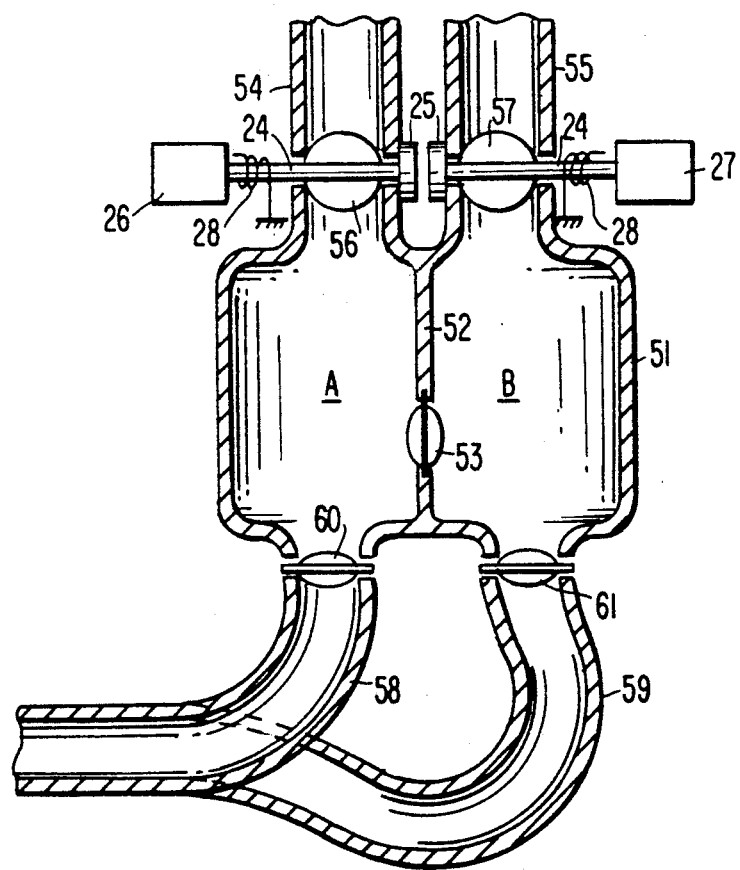
FIG. 7 is a schematic cross sectional view of a throttle unit of the engine of a fourth embodiment according to the present invention.

As shown in FIG. 7, a surge tank 51 disposed in the air intake system of the engine is internally divided by a partition wall 52 into chambers A and B.

This partition wall 52 is provided with a communication passage to make communication between the two chambers, and a shutter valve 53 as a communication control valve is provided in the communication passage. The two chambers communicate with each other or separated from each other by open/close operation of the shutter valve 53.

The surge tank 51 is connected with conduits 54 and 55 as a first divided passage unit to communicate respectively with the chamber A and the chamber B, and intake air is introduced into the surge tank 51 through the conduits 54 and 55. The conduits 54 and 55 are individually mounted with throttle valves 56 and 57, and the amounts of air flowing in the individual conduits 54 and 55 are controlled according to the opening of the throttle valves 56 and 57.

Furthermore, the surge tank 51 is connected with intake pipes 58 and 59 as a second divided passage unit individually communicating with the chamber A and the chamber B, connected at the downstream sides with respect to the air flowing direction. These intake pipes join at their common ends to form confluence passages, which supply air to the combustion chambers of the engine (not shown). These intake pipes 58 and 59 differ in length from each other, the intake pipe 58 being relatively shorter for use as a high-speed passage, and the intake pipe 59 being relatively longer for use as a low-speed passage. The individual intake pipes 58 and 59 are provided with variable intake valve 60 and 61 as intake control valves, which are opened and closed to open and close the individual intake pipes 58 and 59.

The throttle valves 56 and 57 are the same in structure as the above-described throttle valves, and detailed description thereof is omitted.

Then, the throttle valve control system will now be described.

The throttle valve control apparatus of this embodiment comprises operation condition detecting means comprising acceleration pedal operation amount detecting means and engine operation condition detecting means, and control means comprising throttle valve control means for controlling throttle valves according to the acceleration pedal operation amount and intake control means for open/close controlling a communication control valve (shutter valve 53) and intake control valves (variable intake valves 60 and 61).

Figure 8A:
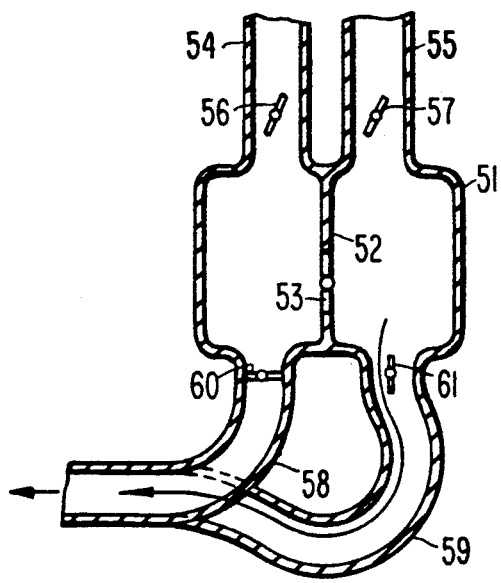
FIG. 8a–d are schematic views showing its function.

With this arrangement, in low-speed operation of the vehicle, as shown in FIG. 8(a), a variable intake valve 60 of a high-speed intake pipe 58 is closed and a variable intake valve 61 of a low-speed intake pipe 59 is opened to intake air using only the low-speed intake pipe. As a result, because the intake passage is small in the cross sectional area and long in length in the low-speed range, the output torque can be increased due to an inertial air-boost effect.

Figure 8B:
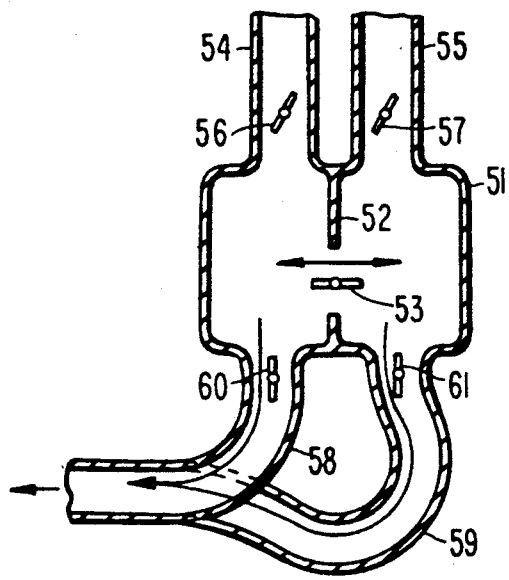

In high-speed operation of the vehicle, as shown in FIG. 8(b), the variable intake valves 60 and 61 are both opened to intake air through both the intake pipes 58 and 59. As a result, the intake passage cross sectional area is increased in the high-speed range, and the inertial air-boost range is shifted to the high-speed range, thereby increasing the output torque. In this case, alternatively, the variable intake valve 61 of the low-speed intake pipe 59 may be closed to use only the high-speed intake pipe 58.

To obtain a resonant air-boost effect of the chambers A and B of the surge tank 51, it is advisable to close the shutter valve 53 of the partition wall 52 as shown in FIG. 8(a) in the low-speed range, and open the shutter valve 53 as shown in FIG. 8(b) in the high-speed range.

Then, a case where a malfunction occurs in any of the throttle valves 56 and 57 will now be described.

Suppose that the control system malfunctions and the throttle valve 56 or 57 is fully closed by the return spring 58. If, for example, the throttle valve 56 is fully closed and becomes uncontrollable, the shutter valve 53 is opened to achieve intake air control by the normal throttle valve 57, as shown in FIG. (c). Also, the variable intake valves 60 and 61 are caused to operate as in the normal condition. This allows continued operation to be ensured. The shutter valve 53 may be closed, and, in this case, the variable intake valve 61 of the normal-side intake pipe 59 is opened.

Suppose that the system becomes uncontrollable with the throttle valve 56 or 57 opened due to jamming of a foreign substance or the like. If the throttle valve 56 become uncontrollable in the open state, as shown in FIG. 8(b), the shutter valve 53 and the variable intake valve 60 of the malfunctioned-side intake pipe 58 are both closed, and the variable intake valve 61 of the normal-side intake pipe 59 is opened to make intake air control by the normal throttle valve 57, thereby ensuring continued operation.

The malfunction determination of the throttle valve control system is the same as described above, and detailed description thereof is omitted.

Figure 8C:
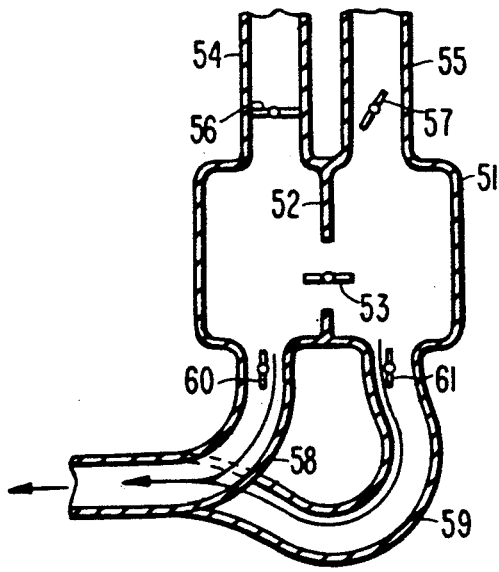
Figure 8D:
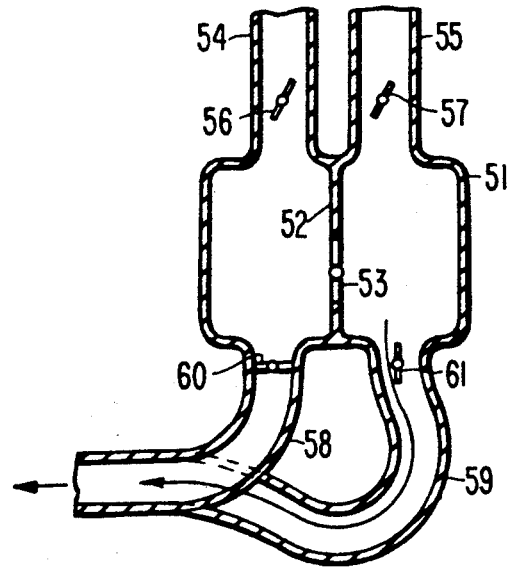

Since, in the above embodiment, the shutter valve 53 is provided which controls communication and blocking between the two chambers of the surge tank 51, the valve can be adequately opened and closed to increase the output torque in the low-speed and high-speed ranges and, as shown in FIG. 8(c), the long and short intake pipes 58 and 59 can be adequately used even if one of the throttle valves becomes malfunctioned in the closed state. However, in the present invention, the shutter valve 53 may be omitted and the two chambers of the surge tank 51 may be isolated from each other.

Furthermore, since, in the present invention, running stability of the vehicle is ensured even if a throttle valve malfunctions in the open state, the return springs 28 of the individual motors 26 and 27 are not necessarily required.

As described above with reference to the embodiments, since the throttle valve control apparatus of the present invention comprises individual throttle valves provided in the plurality of intake passages of the engine, and the throttle valves are controlled by the operation condition detecting means, the first control means for controlling the intake air amount, the determination means for determining a normal throttle valve, and the second control means for controlling only the normal throttle valve in preference to the first control means, the amounts of intake air flowing through the individual intake passages are independently controlled in normal operation condition, and, even if a malfunction occurs in one of the throttle control systems continued operation is ensured using the other intake passage.

Furthermore, since, in the throttle valve control apparatus of the present invention, the surge tanks are individually connected to the first divided passages divided into two systems and having the throttle valves, the two surge tanks communicate through the communication passage and the communication control valve, the surge tanks are provided with the second divided passages having intake control valves connecting to the confluence passages, and the throttle valves, the communication control valve, and the intake control valves are open/close controlled by the operation condition detecting means and the control means, a good engine performance is obtained from the low-speed range to the high-speed range by open/close controlling the communication control valve and the intake control valves, and, even if the throttle valve control system malfunctions, continued operation can be ensured, thereby maintaining the running stability of the vehicle. Furthermore, the present invention can also be achieved at a reduced cost by utilizing conventional art variable intake systems.

We claim:

1. A throttle valve control apparatus comprising an engine mounted on a vehicle, an intake passage unit divided into at least two air intake systems for forming intake passages to supply air to said engine, throttle valves disposed in said individual intake passages, operation condition detecting means for detecting the operation condition of the vehicle, first control means for controlling the amount of intake air into said engine by open/close controlling said throttle valves according to the operation condition of the vehicle detected by said operation condition detecting means, abnormality detecting means for detecting an abnormality in any of said throttle valves to output a detection result, a determination means for determining a normal throttle valve from the detection result of said abnormality detecting means when an abnormality is detected in any of said throttle valves by said abnormality detecting means to output a determination result, and second control means for controlling the amount of air supplied to each cylinder of said engine by controlling only a normal throttle valve determined by said determination means when an abnormality is detected in any of said throttle valves according to the operation condition of the vehicle detected by said operation condition detecting means in preference to said first control means.

2. The throttle valve control apparatus of claim 1 wherein said engine has a plurality of intake ports at each cylinder, said intake passage unit comprises a divided passage unit forming divided passages provided independently in said individual intake ports of the cylinders and a confluence passage unit forming confluence passages for joining said corresponding individual intake ports among individual cylinders at the upstream side of said divided passage unit, and said intake system is formed in each of said confluence passages.

3. The throttle valve control apparatus of claim 2 wherein said throttle valves are provided at said individual confluence passages of said confluence passage unit.

4. The throttle valve control apparatus of claim 2 wherein said throttle valves are provided in said individual divided passages of said divided passage unit.

5. The throttle valve control apparatus of claim 2 wherein said operation condition detecting means comprises acceleration pedal operation amount detecting means for detecting the acceleration pedal operation amount and engine operation condition detecting means for detecting the operation condition of said engine, and said first control means, when all of said throttle valve are detected to be normal by said operation abnormality detecting means, open/close controls all or part of said throttle valves according to the acceleration pedal operation amount detected by said acceleration pedal operation amount detecting means and the engine load condition detected by said engine operation condition detecting means.

6. The throttle valve control apparatus of claim 5 wherein said first control means, when said engine is detected to be in a low-speed operation condition lower than a predetermined rotation speed by said engine operation condition detecting means, fully closes part of said throttle valves and open/close control remaining throttle valves according to the acceleration pedal operation amount detected by said acceleration pedal operation amount detecting means.

7. The throttle valve control apparatus of claim 2 wherein said individual divided passages of said divided passage unit differ in at least one of length and cross sectional area for each intake port.

8. The throttle valve control apparatus of claim 2 wherein said second control means, when an abnormality is detected in any of said throttle valves by said abnormality detecting means, fully closes said throttle valves where said abnormality is detected and open/close controls only said normal throttle valves according to the determination result of said determination means.

9. The throttle valve control apparatus of claim 1 wherein said engine comprises two cylinder groups, said intake passage unit has two surge tanks provided independently for each cylinder group and halfway in each said intake passage, a communication unit for providing communication between said surge tanks, and a communication control valve for opening and closing said communication unit, and said throttle valves are provided in each said intake passage at the upstream side of said surge tanks.

10. The throttle valve control apparatus of claim 9 wherein said operation condition detecting means comprises acceleration pedal operation amount detecting means for detecting the acceleration pedal operation amount and engine operation condition detecting means for detecting the engine operation condition, and said first control means comprises throttle valve control means for controlling said throttle valves according to the acceleration pedal operation amount detected by said acceleration pedal operation amount detecting means and intake control means for open/close controlling said communication control valve according to the engine operation condition detected by said engine operation condition detecting means.

11. The throttle valve control apparatus of claim 10 wherein said intake control means fully closes said communication control valve when said engine is detected to be in a low-speed operation condition lower than a predetermined rotation speed by said engine operation condition detecting means, and fully opens said communication control valve when said engine is detected to be in a high-speed operation condition higher than a predetermined rotation speed.

12. The throttle valve control apparatus of claim 9 wherein said second control means, when an abnormality is detected in one of said throttle valves by said abnormality detecting means, fully closes a throttle valve where said abnormality is detected, opens said communication control valve, and open/close controls only the other throttle valve according to the determination result of said determination means.

13. The throttle valve control apparatus of claim 1 wherein said intake passage unit comprises a first divided passage unit comprising first divided passages divided into two systems, a first surge tank connected at the downstream side of one of said first divided passages of said first divided passage unit, a second surge tank connected at the downstream side of the other of said first divided passages, a communication passage providing communication between said first and second surge tanks, a communication control valve to open and close said communication passage, a second divided passage unit comprising second divided passages each connected to each said surge tank at the downstream side of said individual surge tanks, a first intake control valve disposed in one of said second divided passages of said second divided passage unit, a second intake control valve disposed in the other of said second divided passages of said second divided passage unit, and a confluence passage joining said individual second divided passages of said second divided passage unit and communicating with individual cylinders of said engine, and said throttle valves are disposed in said individual first divided passages of said first divided passage unit.

14. The throttle valve control apparatus of claim 13 wherein said operation condition detecting means comprises acceleration pedal operation amount detecting means for detecting the acceleration pedal operation amount and engine operation condition detecting means for detecting the engine operation condition, and said first control means comprises throttle valve control means for open/close controlling said throttle valves according to the acceleration pedal operation amount detected by said acceleration pedal operation amount detecting means, and intake control means for open/close controlling said communication control valve and said intake control valves according to the engine operation condition detected by said engine operation condition detecting means.

15. The throttle valve control apparatus of claim 14 wherein said intake control means fully closes said communication control valve and one of said intake control valves and fully opens the other of said intake control valves when said engine is detected to be in a low-speed operation condition lower than a predetermined rotation speed by said engine operation condition detecting means, and fully opens said communication control valve and said intake control valves when said engine is detected to be in a high-speed operation condition higher than a predetermined rotation speed.

16. The throttle valve control apparatus of claim 14 wherein said second divided passages of said second divided passage unit comprise a low-speed divided passage and a high-speed divided passage shorter in length than said low-speed divided passage, said intake control means fully closes said communication control valve and fully opens said intake control valve of said low-speed divided passage when said engine is detected to be in a low-speed operation condition lower than a predetermined rotation speed by said engine operation condition detecting means, and fully closes said communication control valve and fully opens said intake control valve of said high-speed divided passage and fully closes said intake control valve of said low-speed divided passage when said engine is detected to be in a high-speed operation condition higher than a predetermined rotation speed.

17. The throttle valve control apparatus of claim 13 wherein said second control means, when an abnormality is detected in one of said throttle valves by said abnormality detecting means, fully closes a throttle valve where said abnormality is detected, opens said communication control valve, and open/close controls only the other throttle valve according to the determination result of said determination means.

18. The throttle valve control apparatus of claim 13 wherein said second control means, when an abnormality is detected in one of said throttle valves by said abnormality detecting means, fully closes a throttle valve where said abnormality is detected, said intake control valve disposed in said second divided passage of the same side as said throttle valve where said abnormality is detected, and said communication control valve, and open/close controls only the other throttle valve according to the determination result of said determination means.

19. The throttle valve control apparatus of claim 13 wherein said abnormality detecting means further comprises opening detecting device for detecting the opening of said throttle valves, said second control means, when an abnormality is detected in one of said throttle valves by said abnormality detecting means, releases open/close control over said one throttle valve, determines whether or not said one throttle valve is fully closed from the opening of said throttle valve detected by said opening detecting means, when said one throttle valve is not fully closed, fully closes said communication control valve and an intake control valve disposed in said second divided passage of the same side as said one throttle valve, and fully opens an intake control valve disposed in said second divided passage of the same side as the other throttle valve and open/close controls only the other throttle valve.

20. The throttle valve control apparatus of claim 1 wherein said abnormality detecting means comprises opening detecting means for detecting the actual opening of said individual throttle valves, opening deviation detecting means for detecting the deviation between target opening values of said individual throttle valves set by said first control means and the actual opening values of said individual throttle valves detected by said opening detecting means, integrating means for obtaining an integration value based on the opening deviation determined by said opening deviation detecting means, and abnormality determination means for determining a throttle valve as being abnormal when the integration value obtained by said integrating means is greater than a predetermined reference integration value.

21. The throttle valve control apparatus of claim 20 wherein said integrating means adds a predetermined addition value to the previous integration value when the opening deviation is greater than a predetermined reference deviation, and subtracts a predetermined subtraction value from the previous integration value when the opening deviation is smaller than the reference deviation.

22. A throttle valve control apparatus comprising an engine mounted on a vehicle, a first divided passage unit comprising first divided passages divided into two systems, a first surge tank connected at the downstream side of one of said first divided passages of said first divided passage unit, a second surge tank connected at the downstream side of the other of said first divided passages, a communication passage providing communication between said first and second surge tanks, a communication control valve to open and close said communication passage, a second divided passage unit comprising second divided passages each connected to each said surge tank at the downstream side of said individual surge tanks, a first intake control valve disposed in one of said second divided passages of said second divided passage unit, a second intake control valve disposed in the other of said second divided passages of said second divided passage unit, a confluence passage joining said individual second divided passages of said second divided passage unit and communicating with individual cylinders of said engine, throttle valves disposed in said individual first divided passages of said first divided passage unit, operation condition detecting means for detecting the operation condition of the vehicle, and control means for open/close controlling said throttle valves, said communication control valve, and said intake control valves according to the operation condition of the vehicle detected by said operation condition detecting means.

23. The throttle valve control apparatus of claim 22 wherein said operation condition detecting means comprises acceleration pedal operation amount detecting means for detecting the acceleration pedal operation amount and engine operation condition detecting means for detecting the engine operation condition, and said control means comprises throttle valve control means for open/close controlling said throttle valves according to the acceleration pedal operation amount detected by said acceleration pedal operation amount detecting means, and intake control means for open/close controlling said communication control valve and said intake control valves according to the engine operation condition detected by said engine operation condition detecting means.

24. The throttle valve control apparatus of claim 23 wherein said intake control means fully closes said communication control valve and one of said intake control valves and fully opens the other of said intake control valves when said engine is detected to be in a low-speed operation condition lower than a predetermined rotation speed by said engine operation condition detecting means, and fully opens said communication control valve and both of said intake control valves when said engine is detected to be in a high-speed operation condition higher than a predetermined rotation speed.

25. The throttle valve control apparatus of claim 23 wherein said second divided passages of said second divided passage unit comprise a low-speed divided passage and a high-speed divided passage shorter in length than said low-speed divided passage, said intake control means fully closes said communication control valve and fully opens said intake control valve of said low-speed divided passage and fully closes said intake control valve of said high-speed divided passage when said engine is detected to be in a low-speed operation condition lower than a predetermined rotation speed by said engine operation condition detecting means, and fully closes said communication control valve and fully opens said intake control valve of said high-speed divided passage and fully closes said intake control valve of said low-speed divided passage when said engine is detected to be in a high-speed operation condition higher than a predetermined rotation speed.

* * * * *

UNITED STATES PATENT AND TRADEMARK OFFICE
CERTIFICATE OF CORRECTION

PATENT NO. : 5,027,769
DATED : July 2, 1991
INVENTOR(S) : YOSHIDA et al

It is certified that error appears in the above-identified patent and that said Letters Patent is hereby corrected as shown below:

On the title page:, Item [73]

"MITSUBISHI JIDOSHA KOGYO AKBUSHIKI KAISHA" is amended to read -- MITSUBISHI JIDOSHA KOGYO KABUSHIKI KAISHA --.

Signed and Sealed this

Sixteenth Day of February, 1993

*Attest:*

STEPHEN G. KUNIN

*Attesting Officer*     *Acting Commissioner of Patents and Trademarks*